United States Patent
Francis

(10) Patent No.: US 11,199,958 B2
(45) Date of Patent: Dec. 14, 2021

(54) NARRATIVE ARC STORY ENGINE

(71) Applicant: Michele Francis, Toronto (CA)

(72) Inventor: Michele Francis, Toronto (CA)

(73) Assignee: Michele Francis, Toronto (CA)

( * ) Notice: Subject to any disclaimer, the term of this patent is extended or adjusted under 35 U.S.C. 154(b) by 131 days.

(21) Appl. No.: 16/370,014

(22) Filed: Mar. 29, 2019

(65) Prior Publication Data

US 2019/0302993 A1    Oct. 3, 2019

Related U.S. Application Data

(60) Provisional application No. 62/650,100, filed on Mar. 29, 2018.

(51) Int. Cl.
*G06F 3/0482* (2013.01)
*G06F 3/0484* (2013.01)
*G11B 27/031* (2006.01)

(52) U.S. Cl.
CPC ........ *G06F 3/04847* (2013.01); *G06F 3/0482* (2013.01); *G11B 27/031* (2013.01)

(58) Field of Classification Search
CPC ... G11B 27/031; G11B 27/322; G11B 27/102; G11B 27/02; G06F 3/04847; G06F 3/0482; G06F 16/4393; G06F 40/186; G06F 40/166
See application file for complete search history.

(56) References Cited

U.S. PATENT DOCUMENTS

| | | | |
|---|---|---|---|
| 6,976,229 B1 | 12/2005 | Balabanovic et al. | |
| 9,460,057 B2 | 10/2016 | Grossman et al. | |
| 9,460,068 B2 | 10/2016 | Kokemohr | |
| 9,478,254 B2 | 10/2016 | Canora et al. | |
| 2006/0253783 A1 | 11/2006 | Vronay et al. | |
| 2008/0256066 A1 | 10/2008 | Zuckerman et al. | |
| 2008/0270905 A1* | 10/2008 | Goldman | G06F 9/453 715/721 |
| 2014/0233919 A1 | 8/2014 | Sabatino | |
| 2014/0351332 A1* | 11/2014 | Ben-Kiki | H04L 51/32 709/204 |
| 2015/0155008 A1* | 6/2015 | Herberger | H04N 9/8211 386/224 |
| 2016/0267807 A1 | 9/2016 | Moreau | |

OTHER PUBLICATIONS

"Adobe Spark Video Tutorial" (Published on Aug. 29, 2016) https://www.youtube.com/watch?v=N7PjfUGcE6A (Year: 2016).*
ADOBE, Adobe Spark: A Guide for Schools and Educators, pp. 1-10.

* cited by examiner

*Primary Examiner* — Rinna Yi
(74) *Attorney, Agent, or Firm* — Bereskin & Parr LLP

(57) ABSTRACT

A method of creating a multi-media presentation, including providing the user a navigator style interface; receiving from the user a narrative arc template choice from a set of narrative arc template options; receiving at least one of a mood choice and a theme choice from a set of mood choices and a set of theme choices from the user, the theme choice determining a story theme and the mood choice determining music and pacing criteria; determining a set of at least one prompt based on the narrative arc template choice and the mood choice or theme choice; presenting the set of at least one prompt to the user to elicit at least two variables from the user, each variable being a question answer or a media item; and compiling a multi-media presentation.

8 Claims, 8 Drawing Sheets

NARRATIVE ARC STORY ENGINE

FIELD

The present specification relates generally to a system and method of generating customized media content, and specifically to customized media content generation using narrative arc templates.

BACKGROUND

As the proliferation of multi-media and video content for the purpose of marketing business services, products, and even personal stories has come to fruition, largely fueled by ubiquitous media content, the editorialized assembly of this content with a narrative story arc has largely remained a specialized domain. The typical workflow of the creation of an editorialized piece of video content that follows a narrative story arc structure includes shooting or gathering of media material, story editing, video editing, music editing, pacing and transitions. As a result, completing such a video can take hours, days, weeks, or even months, depending on the size and scope of the video content and the desired final video presentation needed. This can make the creation of this kind of more compelling video content outside of the reach or scope of many people who don't have the time, skill, money or inclination to do so.

While various media content generation engines are available to ease the presentation of multi-media content, there remains room for improvement.

SUMMARY

In a first aspect, some embodiments of the invention provide a method of creating a multi-media presentation comprising providing the user a navigator style interface for walking a user through the story-arc compilation process and eliciting at least two variables that will be employed in creating the multi-media presentation; receiving from the user a narrative arc template choice from a set of narrative arc template options; receiving at least one of a mood choice and a theme choice from a set of mood choices and a set of theme choices from a user, the theme choice determining a story theme and the mood choice determining music and pacing criteria; determining a set of at least one prompt based on the narrative arc template choice and the mood choice or theme choice; presenting the set of at least one prompt to the user to elicit at least two variables from the user, each variable being a question answer or a media item, the at least two variables providing at least two narrative arc references; and compiling a multi-media presentation incorporating the at least two story arc variables and the at least one media item.

The at least one media item may correspond to at least one media item corresponding to each of the at least two answers.

The method may be a method of generating a custom media product and the method may further comprise outputting the multi-media video presentation as a custom media product.

The media file may be saved on a personal storage system, shared on a social media platform, downloaded, emailed, saved to a story vault, or posted to an application-specific community network.

The multi-media video presentation may be exportable in a variety of different video formats to fit the needs of the user.

The at least two questions may be designed to elicit a narrative arc having at least two combinations of the 'myARC' narrative structure elements: Place; People; Challenge; Action; Struggle; Resolution; Message.

The narrative arc template may be chosen from a set of narrative arc templates and the set of narrative arc templates includes narrative arc templates differing in the arrangements of combinations of the 'myARC' narrative structure elements.

The set of narrative arc templates may include narrative arc templates differing in story setting/style, mood and circumstances.

In some embodiments, prior to receiving the at least one media item, the method further includes presenting the user with at least one request for media or approving media corresponding to the at least two structured questions.

In a second aspect, some embodiments of the invention provide a system for creating a multi-media presentation comprising: at least one storage device storing a set of narrative arc templates; and at least one processor operatively coupled to the at least one storage device to receive a narration file creation request and to access the memory to match the narration file creation request with a selected narrative arc template of the set of narrative arc templates, wherein the at least one processor is configured to execute the selected narrative arc template to compile or confirm at least two answers or data variables from a user and at least one media item from or approved by the user to generate a custom multi-media video product.

The set of narrative arc templates may each include a set of structured questions to elicit a narrative arc having at least two combinations of the 'myARC' narrative structure elements: Place; People; Challenge; Action; Struggle; Resolution; Message.

The 'myARC' narrative structure elements may be programmatically assembled by the system using user data and artificial intelligence models to then be approved by the user either pre or post video creation.

The memory may include a story vault.

The at least one processor may be configured to use the information from the at least two answers to modify the selected narrative arc template or to create a new narrative arc template.

BRIEF DESCRIPTION OF THE DRAWINGS

The drawings included herewith are for illustrating various examples of systems, methods, and apparatus of the present specification. In the drawings.

DETAILED DESCRIPTION

Figure 1:
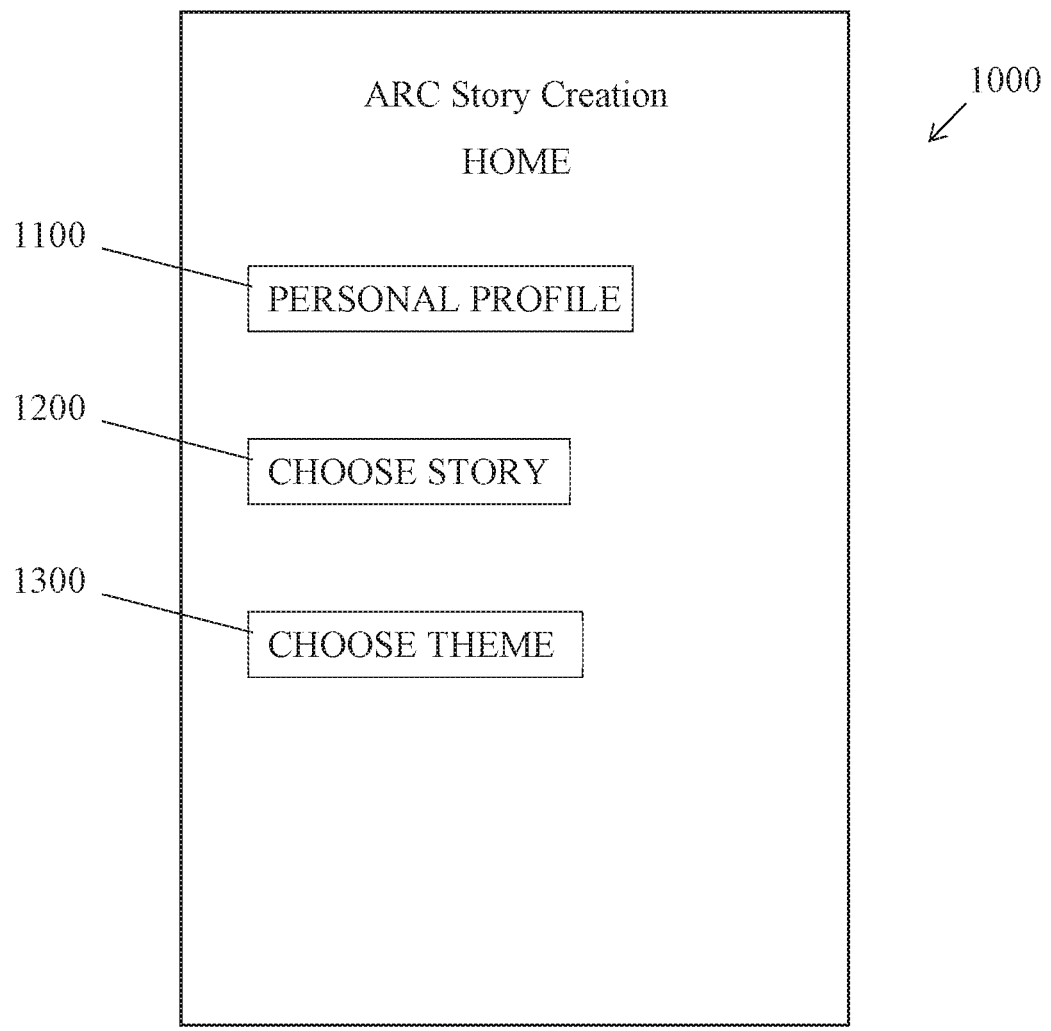
FIG. 1 shows a home screen in accordance with an embodiment.
Figure 2:
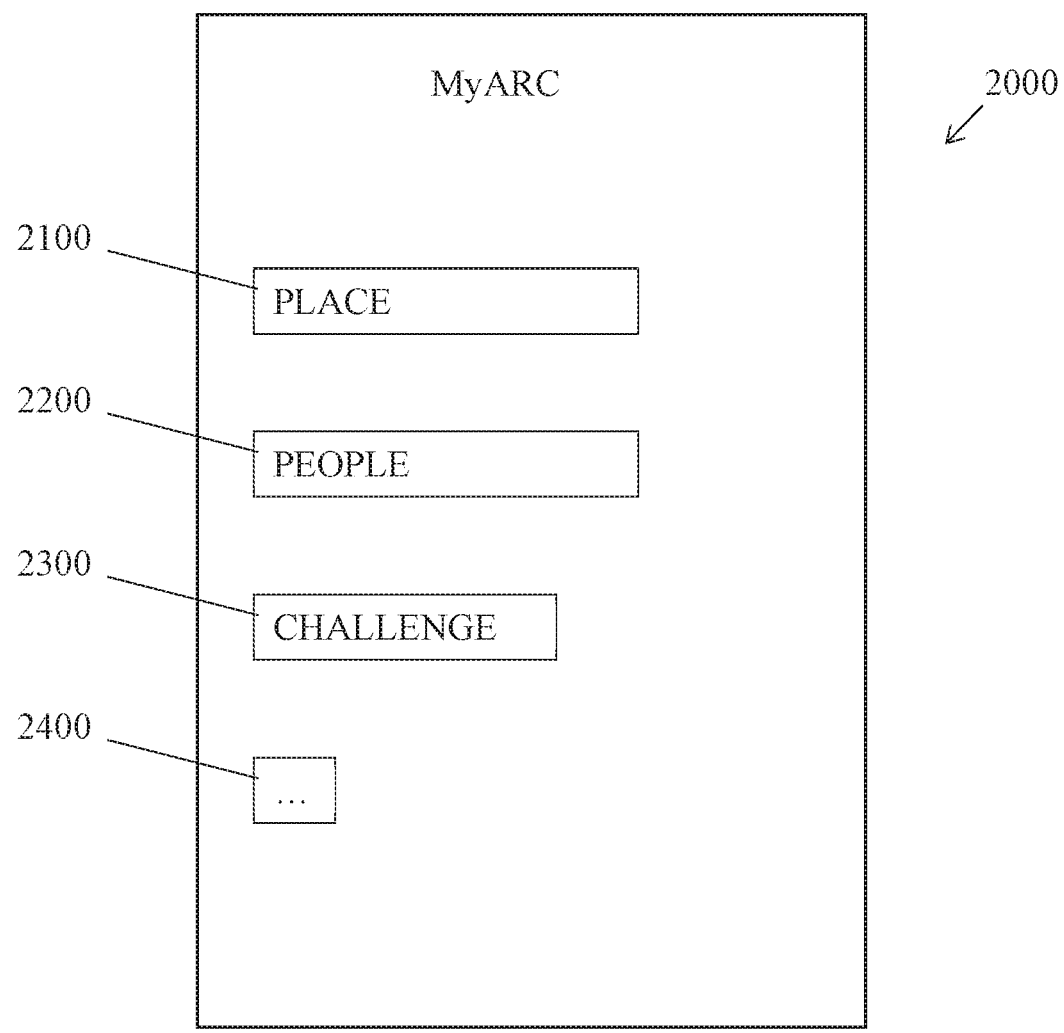
FIG. 2 shows a 'myARC' narrative arc structure element page in accordance with the embodiment of FIG. 1.
Figure 3:
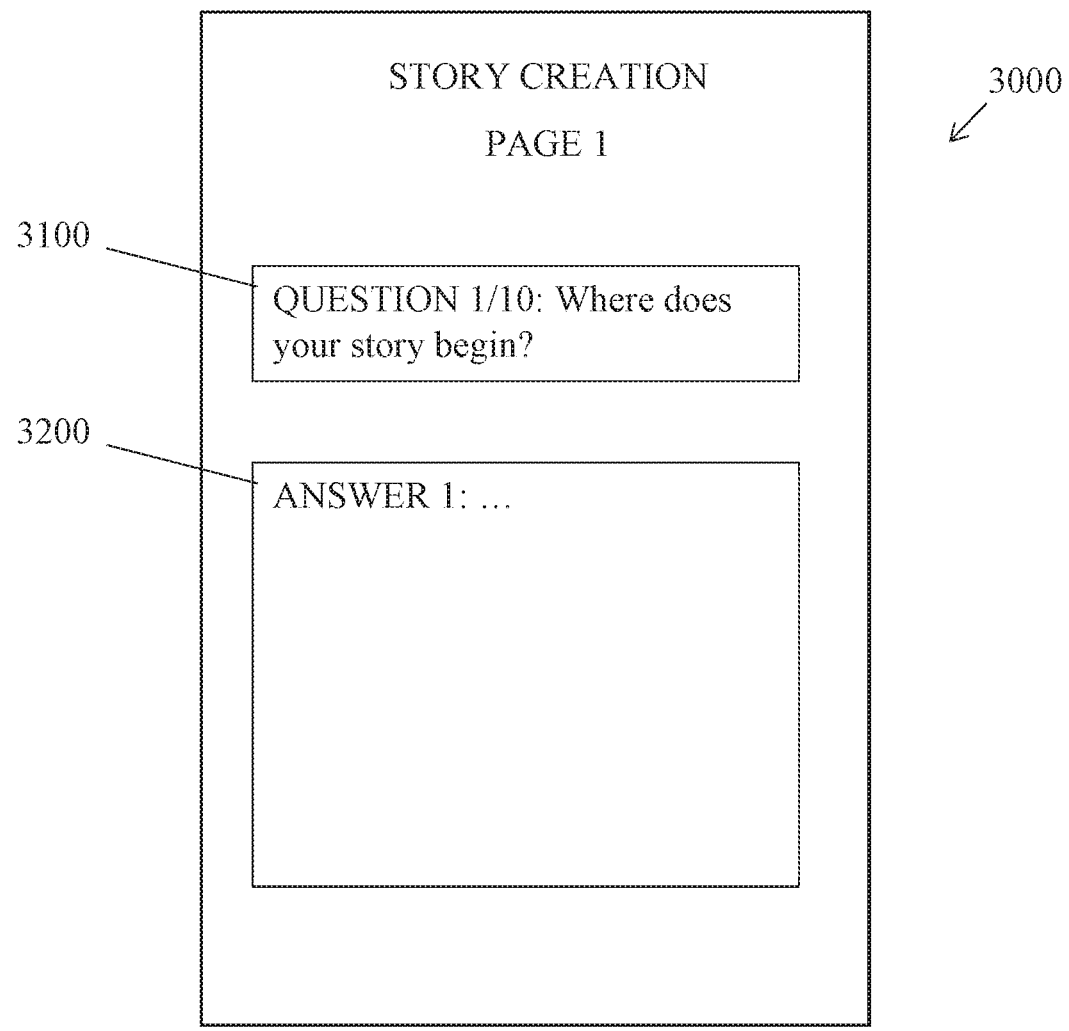
FIG. 3 shows a first story creation page in accordance with the embodiment of FIG. 2.
Figure 4:
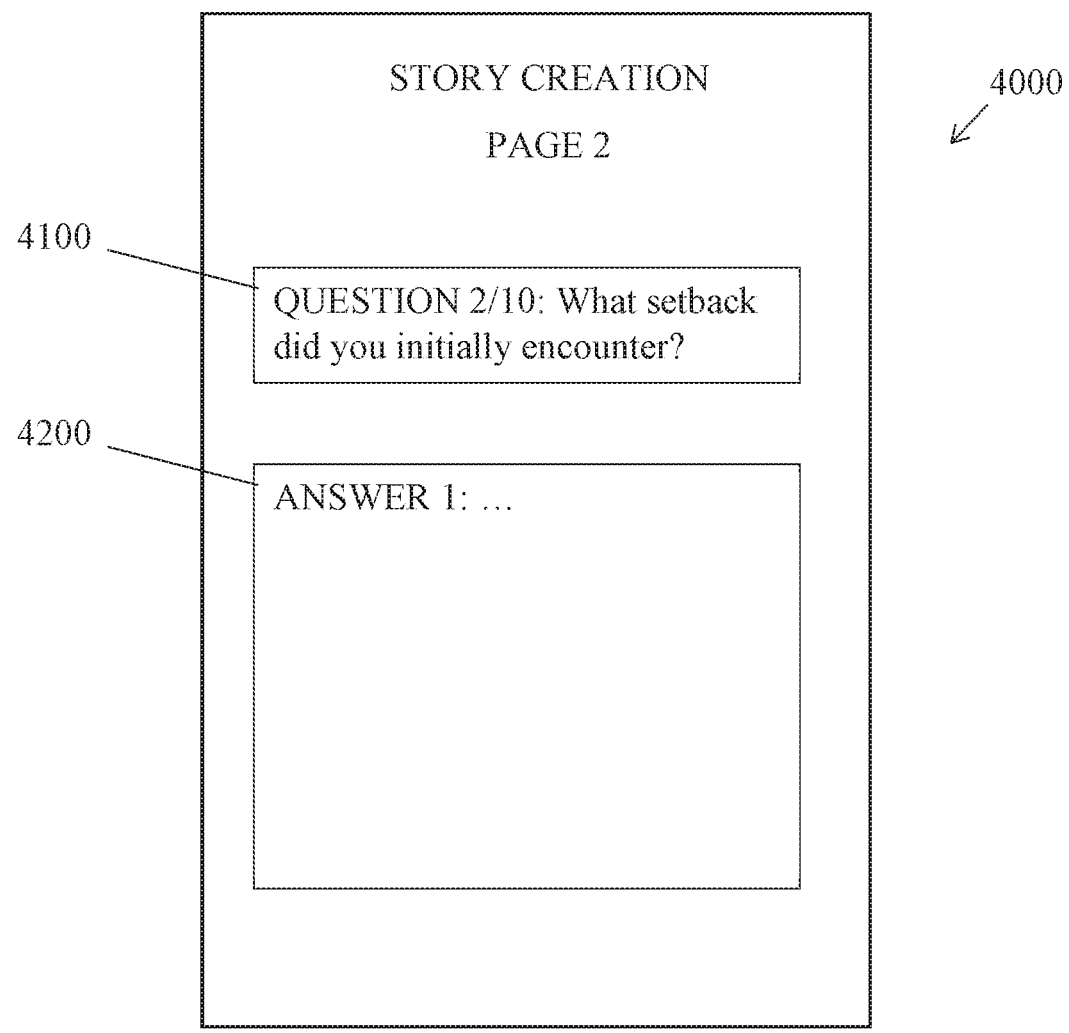
FIG. 4 shows a second story creation page in accordance with the embodiment of FIG. 2.

Various systems, methods and apparatus will be described below to provide an example of each claimed embodiment. No embodiment described below limits any claimed embodiment and any claimed embodiment may cover systems, methods and/or apparatus that differ from those described below. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. The claimed embodiments are not limited to systems, methods and apparatus having all of the features of any one systems, methods and apparatus described below or to features common to multiple or all of the apparatus described below.

For simplicity and clarity of illustration, where considered appropriate, reference numerals may be repeated among the figures to indicate corresponding or analogous elements or steps. The drawings are not necessarily to scale and in some instances, proportions may have been exaggerated in order more clearly to depict certain features of the invention.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and nonvolatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

In an embodiment of the present invention, there is provided a system for creating a video file, comprising: a memory storing a set of narrative arc templates, each with at least two duration options, a music library containing at least two music options, a graphics library containing at least two visual graphics options; and at least one processor operatively coupled to the memory to receive a narration file creation request with a selected narrative arc template of the set of narrative arc templates, wherein the at least one processor are configured to execute the selected narrative arc template to compile at least two inputs from a user and at least one media item from the user to assemble and generate a costume multi-media/video presentation product.

An aspect of this description relates to the compilation of a set of digital media items into a narrated multi-media presentation file, the narration having a story arc and presented in the multi-media presentation by way of one or more of images and video clips, one or more of text and audible words, and music and accompanying pacing of presentation of images or video clips and text or audible words. For example, a set of digital media items may include business or personal related images, videos, or other media provided by or within the control/access of the user combined or intercut with a set of produced images and/or video clips, product images and/or video clips, business images and/or video clips, stock images and/or video clips, graphic images, icons, or other media determined by a narrative arc template and chosen or approved by a user. In some embodiments, text may be part of an image or video clip rather than provided separately, or may be implied by an image or video clip rather than explicit.

This description relates to the creation of narrated stories, including stories of significance with respect to a product, business, object, person, place, or other entity. This description relates to the creation of a multi-media video presentation through which a user may present a story with a narrative arc based on a chosen template and a set of product, business or personal images, video clips, or other media and/or video clips. This description relates to the creation of short or long form multi-media video presentations incorporating themed music to add to the compelling and engaging nature of the narrative arc. This description relates to the incorporation of features to help a user create and display a multi-media video presentation.

Often photos, video clips and other multi-media video items are accumulated, such as by individuals capturing images or videos using mobile devices. While such collections of media items may hold value in uncurated form, such collections often also hold the potential to be formatted into compelling video stories. Formatting media items into a compelling video story may make the media items more enjoyable or easier to share.

A compelling multi-media video presentation may require that media items are programmatically assembled or edited according to a narrative arc structure. In some embodiments, a computer-implemented system or method is provided to create a multi-media presentation, such as a video, having a narrative story arc. In some embodiments, a narrative story arc includes at least one challenge and at least one resolution, paired with at least one complementary media item and with music, and incorporating complementary pacing and transitions to create a finished work infused with the essence of a story. In some embodiments, a computer-implemented system or method facilitates the sharing and saving of the multi-media presentation.

In some embodiments, a computer-implemented system includes at least one storage device, such as a hard drive or random access memory device, storing a set of one or more narrative arc templates. Each narrative arc template includes a set of questions and/or other prompts to be presented to the user. Each narrative arc template includes a set of possible answers to the set of questions from which the user can choose. The user is also given the choice to write their own answer to the set of questions elicited from the choice of narrative arc template. The questions and provided answer options are designed to elicit a narrative from the user. The questions and provided answer options are designed to elicit a story arc structure which includes a challenge and a resolution; at least one point of high fortune and at least one point of low fortune, such as a disaster befalling the protagonist of the story and a resolution and success of the protagonist.

For example, a set of narrative arcs may include a Rags to Riches arc where a beginning of low fortune is followed by an increase in fortune, a Riches to Rags arc where a beginning of high fortune is followed by a decrease in fortune, a Man in a Hole arc where a beginning of high fortune is followed by a decrease in fortune followed by an increase in fortune, an Icarus arc where a beginning of low fortune is followed by an increase in fortune followed by a decrease in fortune, a Cinderella arc includes a beginning of low fortune followed by an increasing fortune followed by a decreasing fortune followed by an increasing fortune, and an Oedipus arc where a beginning of high fortune is followed by a decrease in fortune, followed by an increase in fortune followed by a decrease in fortune. As will be apparent, many combinations and variations of a narrative arc are possible.

In some embodiments, the user may choose from a series of narrative arc templates designed for business promotional or marketing purposes. For example, in a real estate context, the user may choose from a series of templates designed to assemble a pre-edited video presentation that follows a narrative arc using a combination of images and/or video clips of a real estate listing. In this example, the user may receive narrative arc template choices that relate to a real estate context; receive a series of mood or theme choices; a set of narration question and answer choices corresponding to the choice of narrative arc template and the choice of mood or theme; receive direction to upload the real estate listing media; and receive a pre-edited video presentation with music that intercuts the user provided listing media with produced images and/or video clips, graphics, and/or icons to create a listing story video that follows a narrative arc structure that can be used to promote the property in a new way.

As depicted in FIGS. 1 to 5, a user may interact with an embodiment through a series of screens or interfaces. As depicted in FIG. 1, a user is directed to a navigator style interface or home screen 1000. Home screen 1000 asks a user to choose a narrative arc template, and a mood or theme. In other embodiments, other combinations of choices may be available to a user to begin the process, and in some embodiments the user may not be directed to a unified home screen but may be presented with options through some other interface such as through a social media website, popup interface, or other graphical user interfaces when interacting with media items or in some other way.

In some embodiments, a narrated story of a multi-media presentation is conveyed by way of music, images or video clips or other media items, and text. In some embodiments, a narrated story of a multi-media presentation is conveyed by way of audible words in addition to or as an alternative to text. In some embodiments, audible words are disembodied, however in some embodiments, a user is presented with the option of adding an animated avatar to at least a portion of the multi-media file as a narrator of the story to present the story.

A user interacting with home screen 1000 fills out a personal profile using option 1100. A user may indicate a narrative arc or story and a mood or theme choice using Story choice options 1200 and Mood or Theme choice option 1300. Story and mood or theme choices may cooperate to result in a template being chosen from a set of templates, each template including a set of variables relating to the story and mood or theme choices and designed to elicit narration information from the user to create a narrative arc. The set of variables includes content provided by a user in response to prompts from the system, such as answers to questions and/or media items such as photos or video clips.

Narrative arc template choices allow a user to indicate the broad circumstances of the narrative arc video presentation they would like to create. For example the user could indicate the story is about a family member, a product line, a vacation, a real estate agent or about some other event, subject or object.

In some embodiments, a theme is a choice of story type, such as a Cinderella story or a romantic comedy. In some embodiments, a mood is a style such as comic mood or a horror mood. In some embodiments, a narrative or story arc template is a set of questions and/or other prompts to elicit content from a user, such as image, video, or answer content. In some embodiments, a choice of narrative arc template determines the theme but the user may then choose a mood freely. In some embodiments, a user can choose each of a theme, a mood, and a narrative arc template independently, although in some embodiments a choice of one or more of a theme, a mood, and a narrative arc template restricts the choice of one or more of the other of a theme, a mood, and a narrative arc template.

In some embodiments of templates directed towards personal stories, the user will be guided through an interface which offers them a choice of navigation including such inputs as Place; People; Challenge; Action; Struggle; Resolution; Message ('myARC' narrative structure), or any combination of at least two of these myARC narrative structure elements in order to construct a narrative. In other embodiments of templates directed towards product or business stories, the user will first be guided through a series of questions about the product or service the business offers. For example, in the case of a real estate Listing video, the user may be asked for details of the house, how many rooms it has or any other distinguishing features of the house. When following the 'Place, People, Challenge, Action, Struggle, Resolution, Message' structure, details about the house would represent 'Place'. The user may then be prompted to 'Build the Story' and guided through a series of at least one prompt to help them build the narrative arc of the Listing Story. For example, the user may be asked questions about specific things they like to do, or people they like to spend time with at home. This section could represent 'People' and/or 'Action' narrative arc structure elements. The user may then be prompted to 'Add Some Drama' by describing or selecting from options that demonstrate at least two of the 'Challenge; Action; Struggle; Resolution' narrative arc structure elements. For example, the user may be asked to describe a challenge that takes place at home, or may be given options from a list of tough moments that often happen in the home like a renovation, or the death of a pet, or a child's scraped knee, or some other challenge or struggle.

Theme choices allow a user to indicate the type of multi-media video presentation to be told. For example, the user may indicate that it is to be about a Challenge followed by a Resolution like a poor protagonist becoming rich or some other story style. Or in the case of a product or business story, the user may indicate that it is about the different ways to use the particular product or service the business offers, or some other story style.

Mood choices allow a user to indicate the style of multi-media video presentation to be told. For example, the user may indicate that it is a comic style multi-media video presentation. The chosen template will be pre-edited and paced with music that reflect this choice by the user. In some embodiments, a mood choice is the only way for a user to select one or more of music criteria and pacing criteria which determine the selection of music and pacing.

Story, theme and mood choices could be chosen from lists of options, while in some embodiments a user may be able to search using keywords or other search procedures for a desired option, while in some embodiments the user may be permitted to enter custom text or other input and the system will use text recognition or voice recognition or other procedures along with intelligent rules to use the custom entries in the selection of a template.

In some embodiments, the user's choice of a template may be in other ways than through story, theme and mood choices, for example a user may simply select a template from a list of templates or may be prompted with a specific template such as a beginners template or may be offered a suggested template automatically chosen to correspond to information known about the user or may be able to enter custom input to be recognized and acted on to select a template. The story, theme and mood choices and/or template could also be programmatically suggested for a user based on user profile, existing user data, or derived by machine learning models.

When a narrative arc template is selected, the user may then be guided through an interface which offers them a choice of navigation designed to elicit information for the purpose of programmatically assembling a multi-media video presentation with a narrative story arc. When a user has navigated from home screen 1000 and has chosen story, theme and mood options they may then be presented with a 'myARC' narrative arc structure element page 2000. 'myARC' narrative arc structure elements page may present such inputs as Place 2100; People 2200; Challenge 2300; and other inputs 2400 such as Action; Struggle; Resolution; Message or any combination of at least two of these inputs, or it may present inputs that relate to these elements without naming them specifically. With the selection of each input the user is guided through the building of a story arc.

When a 'myARC' narrative arc element is selected, the user may be navigated to the first story creation page 3000. First story creation page 3000 presents a first question 3100, such as asking where the story began or setting up the story in some other way, or in the case of a product or business, such as asking about details of the product or business. The user is provided with a series of optional answers from which to choose as well as a 'write your own' answer box 3200 to input their own answer. In some embodiments, the user's answer may be accepted in other ways, for example the user may be presented with a microphone feature to record a spoken answer. The user may also be permitted or required or directed to select or upload a corresponding media item, such as a photo or video from their personal storage, a photo or video taken by an operatively connected camera, a photo or video from the software applications' own library of produced photos and videos, a photo or video selected from operatively connected databases such as public databases, or some other media item or from some other source. In some embodiments, the request for an answer may be followed by a distinct request for a media item, which may incorporate direction as to which kinds of media are needed or permitted. In some embodiments, this workflow may be significantly reduced with user workflow mainly focused on approving the finished work, or suggesting changes to what was programmatically assembled based on existing user data and machine learning models.

The user may then be presented with a second story creation page 4000. Second story creation page presents the second question 4100 from the template and provides the user with a series of prewritten optional answers from which to choose as well as a 'write your own' answer box 4200. The number of story creation pages depends on the template chosen.

It is to be understood that template questions could be presented in a variety of ways and orders, and answers and media items received in a variety of ways and orders. For example, the template may ask general questions about setting or place before proceeding to questions about events, challenge, people or actions and may not ask about events, challenge, people or actions in sequential order. In some embodiments media items may be the answers, such as clips of a user's voice or photos or videos showing a scene. In some embodiments, some or all of the assembly may be accomplished programmatically with the user simply approving the output or selecting changes.

In some embodiments, earlier answers or media items may inform how later questions in a template are framed. For example, if a user indicates that their narration is in connection with a major event, the template may access information about the event to ask how particular circumstances affected the narration. In some embodiments, some form of machine learning or artificial intelligence may be applied, such as incorporating a feature whereby template modification or updating or new template creation is automatically informed by answers provided by users in the creation of stories, user data, or artificial intelligence models. For example, a series of answers indicating a need for an additional element of challenge or struggle may inform the creation of a new template or the modification of an existing template to include questions for the creation of a new narrative arc.

In some embodiments, user specific templates or modified templates may be provided, such as templates suggested for the user, templates automatically created for the user through machine learning or artificial intelligence features, templates created for the user by administrators such as on request, templates created by the user and saved for future use, or templates shared with the user by community members, or through other means.

In one example, a user who wishes to create a personal story may choose a Biography theme about a family member and an inspirational mood. The template chosen could then offer a choice of navigation inputs that follow the 'myARC narrative structure': Place; People; Challenge; Action; Struggle; Resolution; Message elements, such as a first question asking who the family member is, asking for brief description of the setting of the story beginning and providing a series of prewritten answers as well as a 'write your own' option, asking for a brief description of their fortunes when the story begins, asking for an example of how their situation caused difficulty or challenge, asking for a brief description of what caused them to first emerge from that difficulty or challenge, asking for a description of a difficulty encountered in emerging from that difficulty or challenge, asking for a description of how they overcame that difficulty or challenge, asking for a brief description of how their resolution of the difficulty or challenge propelled them to a point of Resolution, asking for an example of how the point of Resolution caused joy or some other emotion, and asking for a brief description of the setting of the Resolution, or any combination of at least two of these questions. The template may also ask for multi-media items to be provided in connection with each or some of the answers, for example the user may be prompted to provide a photo or video clip of the house the family member first lived in or a photo or video clip of the location of the difficulty or challenge encountered or a photo or video clip of a person who helped overcome the difficulty or challenge or a photo or video clip of the house the family member lived in at the end. As discussed, photos and/or video clips could be drawn from personal collections, or from other sources. In some embodiments, produced photos and/or video clips may be available, sets of stock photos may be available, such as photos of Second World War bombers which could be used in connection with the description of the destruction of a family member's house by a bomb in the Second World War. The purpose of this example is to illustrate the unique software-based programmatic assembly of a resulting multi-media presentation created based on user input or data along with story direction, and final editing with pacing, transitions, and music designed with the purpose of producing a finished work in the form of a story arc.

In some embodiments, multiple templates will be provided, corresponding to different combinations of initial user input, such as story, theme and mood choices. Each template may also include emotionally cooperative music, such as music options curated to match the desired emotional moment or music automatically matched to the emotional moment. In some embodiments, music will be curated and edited to match and propel the up and down nature of the chosen narrative arc template. The powerful effect of music on the compelling nature of a story may require a fine tuned matching between story elements and music selection, such as through machine learning or artificial intelligence features matching answer elements and media item elements to musical selections.

In some embodiments a set of templates may be provided, and a user may also be given access to community-developed templates such as templates created by other users.

In some embodiments, a story vault feature will be incorporated to allow users to save personal information, including created multi-media video presentations, using blockchain or similar encryption. Embodiments may employ blockchain or similar encryption to provide an alternative to traditional storage and transmission to allow for greater security or convenience or economy.

The structured questions of each template may be framed in a variety of ways, such as asking direct questions, suggesting answer options to choose from, or otherwise framed.

In some embodiments, the user's response's to the structured questions are compiled along with the media items and the resulting narration copy is displayed over the media item in the form of text on screen. For example, the output may be a multi-media video presentation with text on screen that corresponds to any combination of the answers provided by the user and prewritten story content that helps to flesh out the chosen narrative arc template. This onscreen text would be strategically placed within the structure of the multi-media video presentation in order to highlight moments in the video presentation that correlate with the elements of the 'myARC' narrative arc structure. The resulting multi-media video presentation would include user provided images and/or video clips, produced images, and/or produced video clips, graphics or icons and text on screen. In connection with the Biography example, provided above, a multi-media video presentation may open to show an image of the house the family member first lived in while the text on screen reflects some combination of the answer given by the user regarding the setting of the story and a prewritten context into which that answer is placed that reflects the template chosen. The photo or video clip of the house may then transition to a photo or video clip representing how the family member encountered a challenge or difficulty while the text on screen derives from the answer to the second question of the template and so on.

In some embodiments, the user's response's to the structured questions are compiled along with the media items, and the resulting narration copy is presented as voice over narration. Voice over narration is determined by either the users' own voice responses to the questions via microphone, or by text to speech technology. For example, the output may be a multi-media video presentation with user recorded or text to speech generated voice over narration that corresponds to any combination of the answers provided by the user and prewritten story content that helps to flesh out the chosen narrative arc template. As with the onscreen text, this voice over narration would be strategically placed within the structure of the multi-media video presentation in order to highlight the moments in the video presentation that correlate with the elements of the 'myARC' narrative arc structure. The resulting multi-media video presentation would include user provided images and/or video clips, produced images, and/or produced video clips, graphics or icons, or any combination of these, and voice over narration.

It is to be understood that answers provided may be incorporated other than directly in some embodiments. For example, the text on screen or voice over narration may employ suitable transition phrases or intonations or other elements. In some embodiments answers may be parsed or otherwise processed to retrieve information from the user for the software to use in another way, without the text on screen or voice over directly reciting the responses or parts of responses. In some embodiments part or all of the responses or other related information may be reproduced as graphic images on screen, icons, produced images and/or video clips. In some embodiments the text on screen or voice over narration may reference music or other auditory elements directly or may reference any transitions from one auditory element to another such as a transition from a slow or melancholy piece of music to a more suspenseful piece of music as the narrative arc develops. In some embodiments the text on screen or voice over narration may only provide commentary such as stock commentary, while the responses to the template questions may be reflected through a combination of images and or video clips, graphic images or icons overlaying or otherwise interacting with the user provided media items. In some embodiments, an amount of the answers will be programmatically derived based on user data and/or artificial intelligence models.

Figure 5:
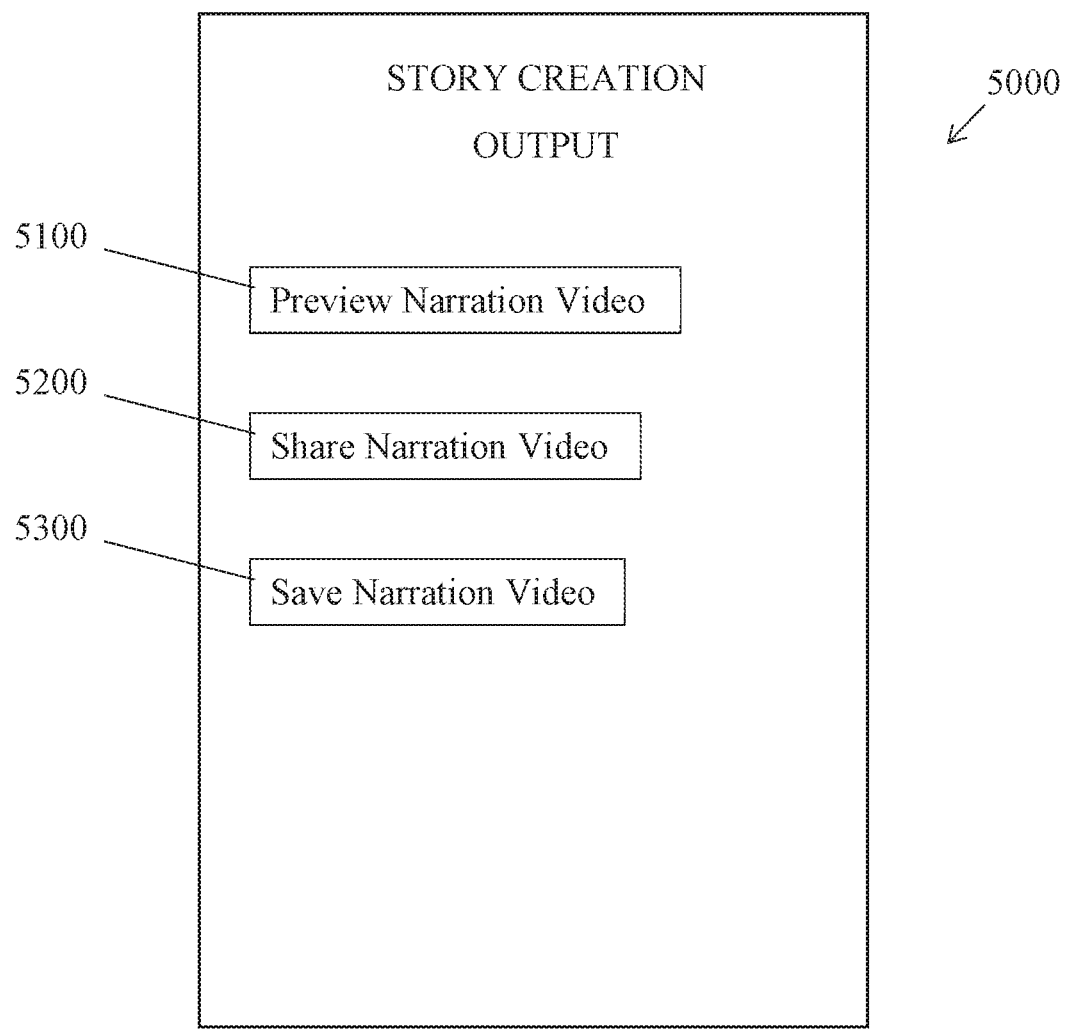
FIG. 5 shows a story creation output page in accordance with the embodiment of FIG. 1.

As depicted in FIG. 5, a story creation output screen 5000 allows the user to select a preview multi-media video presentation option 5100, a share multi-media video presentation option 5200, and a save multi-media video presentation option 53000. Resulting video presentations, such as presentation products or files, could be exported to a platform of the user's choice. For example, the user could share the presentation on a social media site, download it, send it by email, save it to the story vault, or post it on the application's community network.

In some embodiments community or networking features may be provided. For example, once a user has created a multi-media video presentation, besides being able to share it on the social media platform of their choice, download it, email it, or save it in their story vault, they have the option of posting it within the software application itself so that it is visible to only the other users of the software application. Such posts may contribute to a community and may allow users to see examples of other people's multi-media video presentations and get inspiration for their own.

In some embodiments, elements of embodiments may incorporate length or size limits to allow the narrative to be easily and convincingly constructed, such as limiting answers to 5 words or less or limiting the template to 2 questions or limiting the resulting narrative to 10 seconds. In some embodiments, the application may include a series of prompts to help a user select the correct template, may access a user's information to allow the application to suggest a template, may provide a library of stock footage, may focus on emotion-based themes rather than location or event-based themes, and may make suggestions and/or elicit further information for the user in the development of their work based on best story arc practices.

Figure 6:
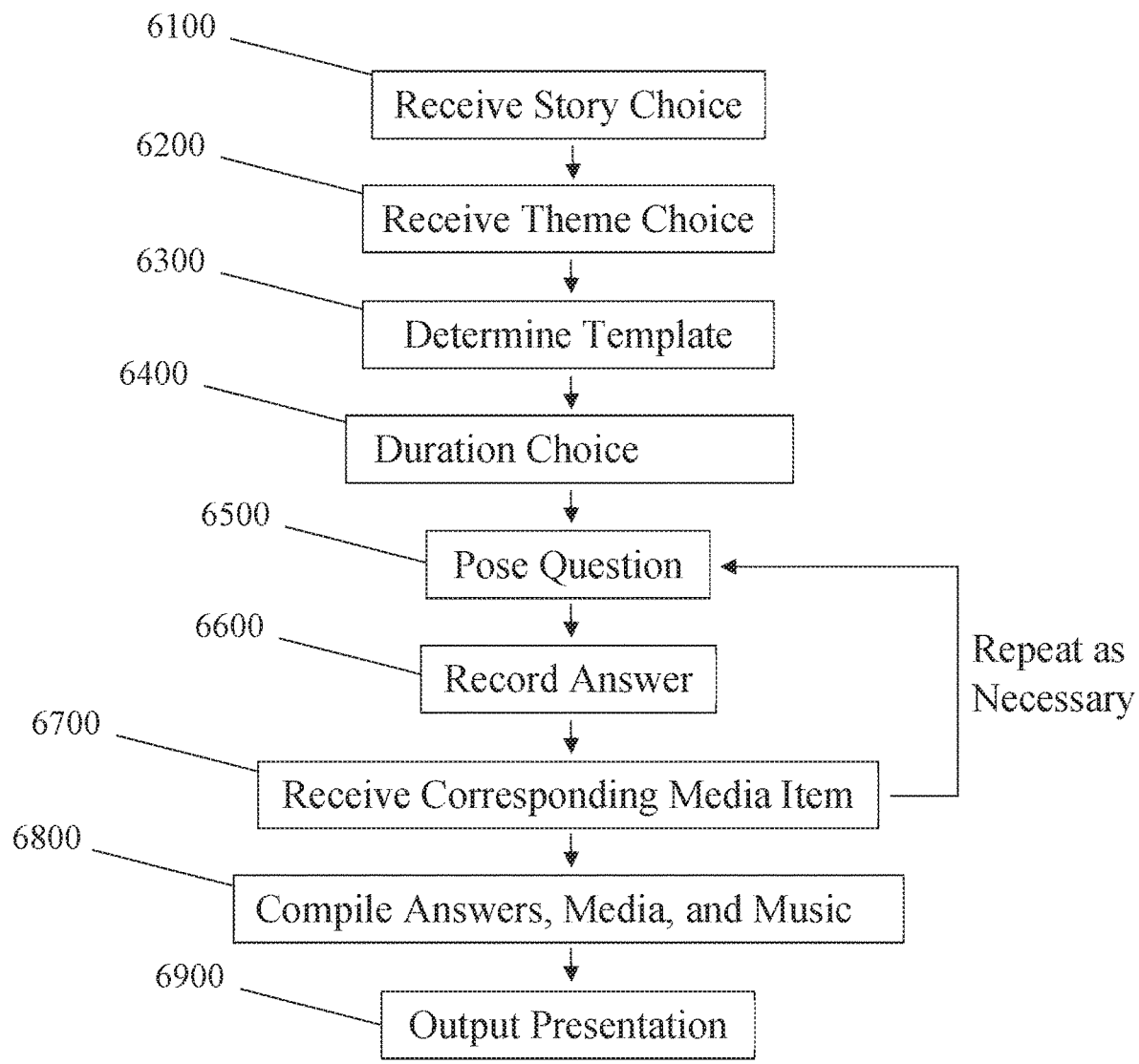
FIG. 6 is a flow diagram of steps in the creation of a custom presentation according to an embodiment.

As depicted in FIG. 6, embodiments of a software application to produce multi-media content created with a narrative arc story engine follows a series of steps wherein an aspect ratio is received, a story choice is received 6100, a theme and/or mood choice is received 6200, a template choice is determined 6300, a multi-media video presentation duration choice is received 6400, and a series of questions 6500 are presented that directly or indirectly follow the 'myARC' narrative arc structure to elicit narration information following a narrative arc having at least two combinations of the 'myARC' narrative structure: Place; People; Challenge; Action; Struggle; Resolution; Message, answers and/or selections and associated media items are received 6600 and 6700, the answers and/or selections and media items are compiled 6800, and a multi-media video presentation is output 6900. The multi-media video presentation can be exported in a variety of different video formats to fit the needs of the user.

Figure 7:
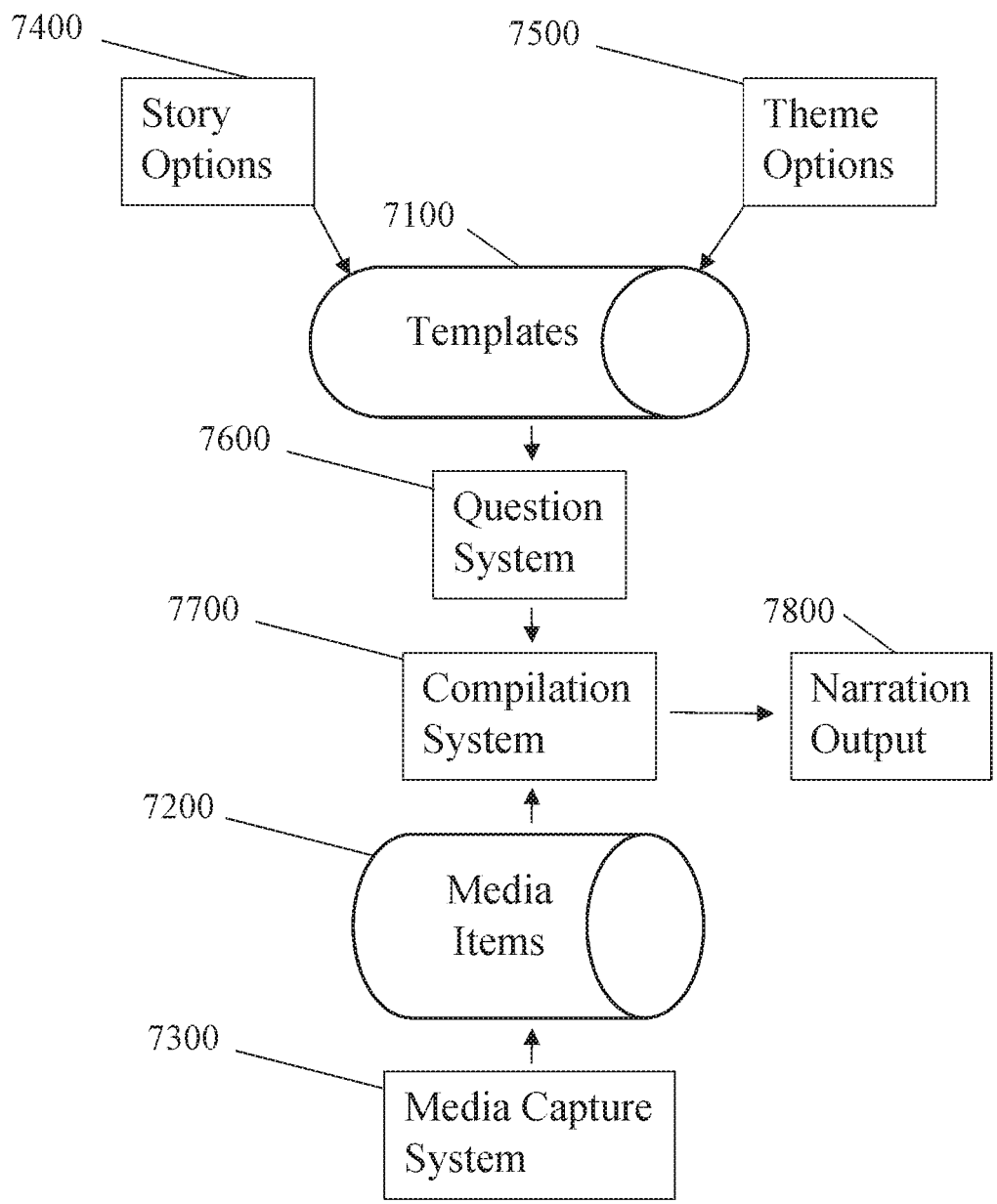
FIG. 7 is a schematic diagram of a system for generating a custom media product, for use with embodiments of the invention.

In some embodiments, such as depicted in FIG. 7, a system may be employed. In the embodiment depicted, the system includes storage devices containing templates 7100 and media items 7200, the media items storage receiving input from one or more media capture systems 7300. In the embodiment depicted, a template is selected based on user-chosen story 7400 and theme and/or mood options 7500 and the template produces one or more questions 7600 to elicit story information from the user in the form of one or more answers and/or selections.

As depicted in FIG. 7, a compilation system 7700, which may include a mobile device, a tablet, a laptop or a desktop computer accepts user responses and/or selections of pre-written responses to the one or more questions as well as user selections of media items and the compilation system then compiles the content into a multi-media video presentation output 7800. As discussed above, the templates are designed to elicit answers, and/or selections from a series of prewritten answers, from the user telling a story having a narrative arc having at least two combinations from the 'myARC' narrative structure elements: Place; People; Challenge; Action; Struggle; Resolution; Message. In some embodiments the compilation system also receives other feature information to compile.

Figure 8:
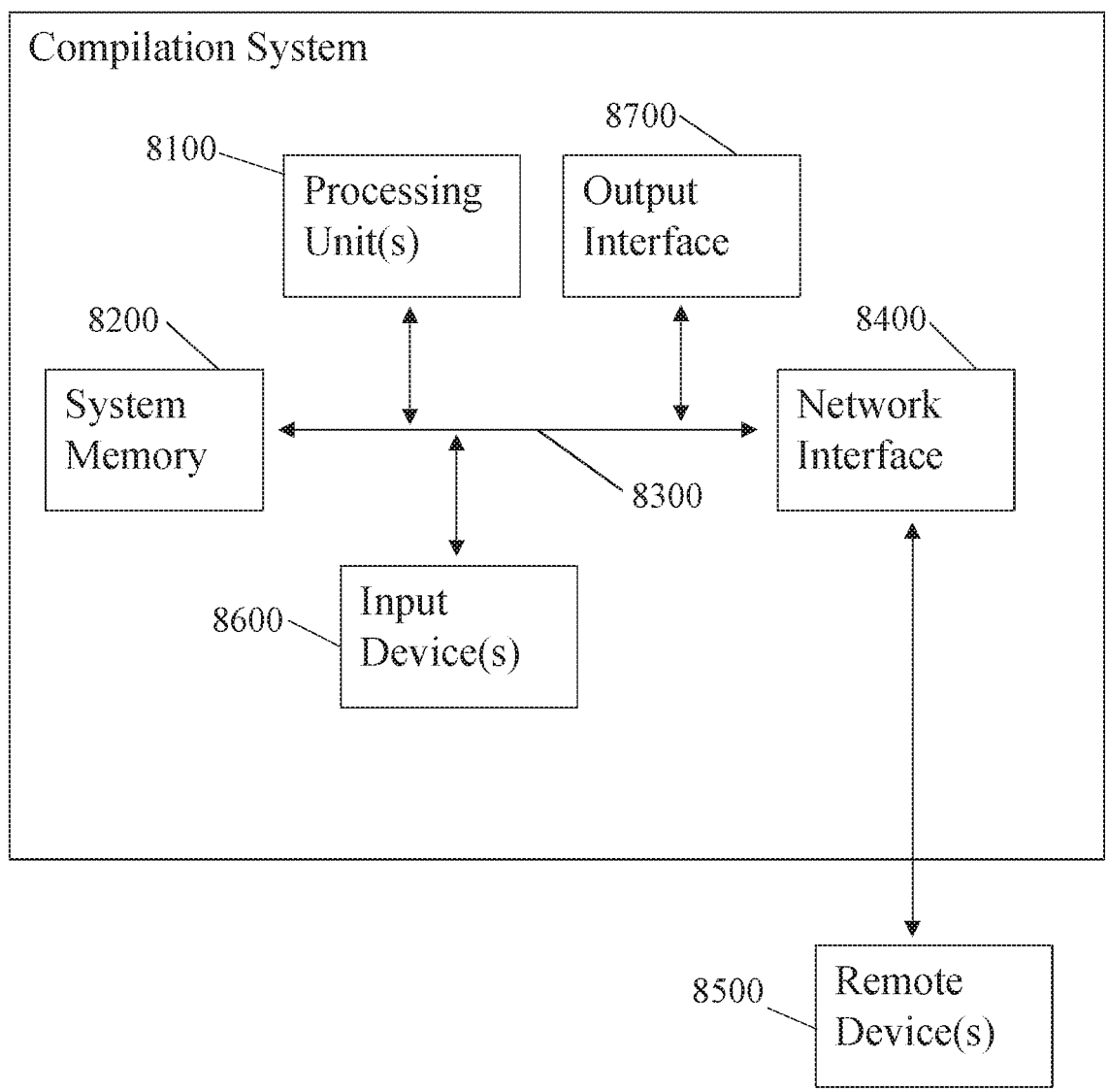
FIG. 8 is a schematic diagram of a computer compilation system, for use with embodiments of the invention.

Embodiments of the present invention may be implemented using devices, such as the computer compilation system depicted in FIG. 8. The computer compilation system may execute computer instructions to perform steps involved in selecting templates, presenting questions, compiling answers and/or selections of answers and compiling media items into multi-media video presentations, and other processing related to embodiments of the present invention.

As depicted in FIG. 8, a computer compilation system may include a processing unit 8100 and a system memory 8200 which may be interconnected across a system bus or network 8300, or a distributed network accessing data either explicitly or through interface 8400 connecting to one or more remote devices 8500. The computer compilation system may have access to computer readable media, and the system memory may include computer readable storage media in the form of volatile and/or nonvolatile memory such as read only memory and/or random access memory. In some embodiments system memory may include an operating system, application programs, and program data.

A user using the computer compilation system depicted in FIG. 8 may interface with the computer through input devices 8600, such as a mouse or keyboard, to provide information and instructions. A user may receive information from the system from output devices 8700, such as a monitor or network or output interface, to receive presentations or media files or items or content. In some embodiments a computer compilation system may be networked and operable as a distributed system, a computer compilation system may also be able to access distributed databases for information or processing capability.

Some embodiments may be implemented as a system, a method, or a computer program product. Accordingly, aspects of the invention may take the form of an entirely hardware embodiment, an entirely software embodiment (such as including firmware and resident software) or an embodiment combining software and hardware aspects. Aspects of some embodiments may take the form of a computer program produced embodied in one or more computer readable medium having computer readable program code embodied therewith.

The present invention has been described here by way of example only. Various modification and variations may be made to these exemplary embodiments without departing from the spirit and scope of the invention, which is limited only by the appended claims.

The invention claimed is:

1. A method of creating a multi-media presentation via a plurality of pages displayed on a screen of a computing device for walking a user through a story-arc compilation process and eliciting at least two variables that will be employed in creating the multi-media presentation, comprising:

a. presenting, via one or more navigator page of the plurality of pages, a user with a set of mood choices, a set of theme choices, and a set of narrative arc template options, wherein each narrative arc template of the set of narrative arc template options includes a set of questions and possible answers to the set of questions, and each narrative arc template of the set of narrative arc template options includes emotionally cooperative music options;
 b. receiving from the user a narrative arc template choice from the set of narrative arc template options;
 c. receiving at least one of a mood choice and a theme choice from the set of mood choices and the set of theme choices from the user, the theme choice determining a story theme and the mood choice determining music and pacing criteria;

d. determining a set of questions based on the narrative arc template choice and the mood choice or theme choice;
e. determining a set of possible answers to the set of questions based on the narrative arc template choice and the mood choice or theme choice;
f. following receiving the narrative arc template choice and the mood choice or theme choice, presenting, via a series of pages of the plurality of pages, the set of questions and the set of possible answers to the user to elicit the at least two variables and at least one media item from the user, each variable being a question answer of the set of possible answers, the at least two variables providing at least two narrative arc references, the at least two variables including a combination of at least two narrative arc structure elements: Place, People, Challenge, Action, Struggle, Resolution, and Message; and
g. compiling the multi-media presentation, the multi-media presentation incorporating the at least two variables, the at least one media item, and a music selection of the emotionally cooperative music options, and
wherein the at least two variables includes a first answer of the set of possible answers and a second answer of the set of possible answers, and wherein the first answer provides a first narrative arc reference of the at least two narrative arc references and the second answer provides a second narrative arc reference of the at least two narrative arc references, the first narrative arc reference being a point of high fortune and the second narrative arc reference being a point of low fortune,
wherein the multi-media presentation includes a narrative story arc incorporating the point of high fortune and the point of low fortune, and
wherein the music selection is chosen via machine learning or artificial intelligence, and is matched via the machine learning or artificial intelligence to both the point of high fortune and the point of low fortune to emotionally propel the narrative story arc.

2. The method of claim 1, wherein the at least one media item includes a first media item corresponding to the first answer and a second media item corresponding to the second answer.

3. The method of claim 1, wherein the method is a method of generating a custom video media product and the method further comprises outputting the multi-media presentation as the custom video media product.

4. The method of claim 3, wherein the custom video media product is saved on a personal storage system, shared on a social media platform, downloaded, emailed, saved to a story vault, or posted to an application-specific community network.

5. The method of claim 3, wherein the custom video media product can be exported in a variety of different video formats to fit the needs of the user.

6. The method of claim 1, wherein the set of narrative arc template options includes narrative arc templates differing in the narrative arc structure elements associated therewith.

7. The method of claim 6, wherein the set of narrative arc template options includes narrative arc templates differing in story setting, style, mood and circumstances.

8. The method of claim 1, further comprising:
presenting the user with a set of mood candidates comprising a comic mood, a horror mood, and an inspirational mood, and
receiving the mood choice selected from the set of mood candidates.

* * * * *